(12) United States Patent
Ona

(10) Patent No.: US 6,985,759 B2
(45) Date of Patent: Jan. 10, 2006

(54) OPENING/CLOSING STRUCTURE FOR A FLIP ATTACHED TO A PORTABLE PHONE

(75) Inventor: Masaaki Ona, Kawagoe (JP)

(73) Assignee: Kabushiki Kaisha Strawberry Corporation, Saitama-ken (JP)

( * ) Notice: Subject to any disclaimer, the term of this patent is extended or adjusted under 35 U.S.C. 154(b) by 730 days.

(21) Appl. No.: 09/757,575

(22) Filed: Jan. 11, 2001

(65) Prior Publication Data

US 2001/0014591 A1    Aug. 16, 2001

(30) Foreign Application Priority Data

Jan. 18, 2000    (JP)    .............................. 2000-008845

(51) Int. Cl.
*H04M 1/00*    (2006.01)

(52) U.S. Cl. .................. 455/575.3; 455/347; 455/90.3; 379/433.13

(58) Field of Classification Search .. 455/575.1–575.7, 455/349, 344, 345, 346, 347–351, 550.1, 455/90.3; 379/428.01–433.13, 441–456
See application file for complete search history.

(56) References Cited

U.S. PATENT DOCUMENTS

| | | | | |
|---|---|---|---|---|
| 5,278,993 A | * | 1/1994 | Reiff et al. | 455/575.3 |
| 5,606,730 A | * | 2/1997 | Rush et al. | 455/575.3 |
| 5,640,690 A | * | 6/1997 | Kudrna | 455/575.3 |
| 5,649,309 A | * | 7/1997 | Wilcox et al. | 455/575.3 |
| 5,704,094 A |   | 1/1998 | Hartigan et al. | |
| 5,832,079 A | * | 11/1998 | Rabe | 379/433.13 |
| 5,983,083 A | * | 11/1999 | Horne | 455/575.3 |
| 6,091,938 A | * | 7/2000 | Go | 455/575.3 |
| 6,119,019 A | * | 9/2000 | Phelps | 455/575.3 |
| 6,256,481 B1 | * | 7/2001 | Jeong et al. | 455/575.3 |

FOREIGN PATENT DOCUMENTS

| | | |
|---|---|---|
| EP | 0765063 A2 | 3/1997 |
| GB | 2337299 A | 11/1999 |
| WO | WO 93/18592 A1 | 9/1993 |
| WO | WO 98/49814 A1 | 11/1998 |
| WO | WO 99/49638 A1 | 9/1999 |

* cited by examiner

*Primary Examiner*—Charles Craver
(74) *Attorney, Agent, or Firm*—Sughrue Mion, PLLC

(57) ABSTRACT

To provide a novel opening/closing structure for a flip provided to a portable phone, which is superior in evaluation on the market, a flip (3) that is rotatable in an opening direction from a condition where a phone operating portion (2) provided on a surface of a portable phone body (1) is covered by the flip to the condition where the phone operating portion (2) is exposed is provided at a predetermined position on the surface of the portable phone body (1). A biasing mechanism is provided with a closing biasing force to bias the flip (3) in a closing direction in a closed side position from a predetermined position B in the case where the flip (3) kept under the condition where the phone operating portion (2) is covered is rotated through a predetermined distance when the flip (3) is kept slanted to the surface of the portable phone body (1) and an opening biasing force to bias the flip (3) in an opening direction in an opened side position from the predetermined position B is provided in a hinge portion (4) between the flip (3) and the portable phone body (1).

4 Claims, 7 Drawing Sheets

OPENING/CLOSING STRUCTURE FOR A FLIP ATTACHED TO A PORTABLE PHONE

BACKGROUND OF THE INVENTION

The present invention relates to an opening/closing structure for a flip attached to a portable phone.

Recently, a variety of kinds and a variety of specifications of portable phones have been proposed in order to meet the consumers' needs under the circumstances that portable phones have been used more and more.

Among these phones, there is such a type that a flip is provided for covering and uncovering a phone operating portion provided on a top surface of a portable phone body.

This flip is formed into a planar shape and provided rotatably (collapsibly) at a proximal end portion on the top surface of the portable phone body. When the flip is opened, the phone operating portion is exposed for the operable condition and at the same time serves to exhibit the sound collection effect during the conversation. On the other hand, when the flip is collapsed, the flip exhibits such an effect that any malfunction of the phone operating portion may be prevented, in the case where the phone operating portion is covered by the flip and received in, for example, the user's pocket.

The present applicant has vigorously studied the portable type phone provided with this flip and made the invention of a novel opening/closing structure attached to the portable phone which is extremely valuable on the market.

SUMMARY OF THE INVENTION

The essence of the invention will now be described.

According to the present invention, there is provided an opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, the biasing mechanism being provided in a hinge portion between the flip and the portable phone body, further comprising: a rotary shaft; a first cam portion provided in the rotary shaft; a bearing member; and a second cam portion provided in the bearing member and having a shape to come into pressing contact with the first cam and convex/concave engaged with the first cam portion; wherein a relative rotation biasing force is generated between the rotary shaft and the bearing member by the engagement from the non-engagement between the first cam portion of the rotary shaft and the second cam portion of the bearing member when the rotary shaft and the bearing member are rotated relative to each other, and the relative rotation biasing force generated between the rotary shaft and the bearing member is caused to function as the closing biasing force and the opening biasing force to thereby constitute the biasing mechanism; and at least a contact portion between the first cam portion of the rotary shaft and the second cam portion of the bearing member is formed by a member made of metal.

Also, according to the present invention, there is provided an opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, the biasing mechanism being provided in a hinge portion between the flip and the portable phone body, further comprising: a rotary shaft; a first cam portion provided in the rotary shaft; a bearing member; and a second cam portion provided in the bearing member and having a shape to come into pressing contact with the first cam and convex/concave engaged with the first cam portion; wherein a relative rotation biasing force is generated between the rotary shaft and the bearing member by the engagement from the non-engagement between the first cam portion of the rotary shaft and the second cam portion of the bearing member when the rotary shaft and the bearing member are rotated relative to each other, and the relative rotation biasing force generated between the rotary shaft and the bearing member is caused to function as the closing biasing force and the opening biasing force to thereby constitute the biasing mechanism; the first cam portion of the rotary shaft and the second cam portion of the bearing member are formed by a member made of synthetic resin; and a contact portion between the first cam portion and the second cam portion is constituted by a metal member at a mutual convex/concave portion between the first cam portion and the second cam portion.

According to the present invention, there is provided an opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, the biasing mechanism being provided in a hinge portion between the flip and the portable phone body, further comprising: a rotary shaft; a first cam portion provided in the rotary shaft; a bearing member; and a second cam portion provided in the bearing member and having a shape to come into pressing contact with the first cam and convex/concave engaged with the first cam portion; wherein a relative rotation biasing force is generated between the rotary shaft and the bearing member by the engagement from the non-engagement between the first cam portion of the rotary shaft and the second cam portion of the bearing member when the rotary shaft and the bearing member are rotated relative to each other, and the relative rotation biasing force generated between the rotary shaft and the bearing member is caused to function as the closing biasing force and the opening biasing force to thereby constitute the biasing mechanism; a metal member is fitted and arranged in a mutual convex/concave portion between the first cam portion of the rotary shaft and the second cam portion of the bearing member; and at least a contact portion between the first cam portion of the rotary shaft and the second cam portion of the bearing member is constituted by a member made of metal.

The embodiments of the present invention will now be described briefly with the advantages.

According to the present invention, for example, when the flip is rotated and raised through a predetermined distance by a finger of a hand holding the portable phone body and the flip is passed through the predetermined position in the case where the flip is kept slanted to the surface of the portable phone body, the flip is rotated in the opening direction by the opening biasing force of the biasing mechanism so that the phone operating portion is exposed.

Also, when the flip is rotated against the opening biasing force of the biasing mechanism and caused to pass through the predetermined position, the flip is rotated in the closing direction by the closing biasing force of the biasing mechanism to cover the phone operating portion.

Accordingly, it is possible to easily and quickly switch the positions of the flip by the hand holding the portable phone body from the condition where the phone operating portion is covered by the flip to the condition where the phone operating portion is exposed. In addition, does not only the biasing mechanism provided in the hinge portion between the flip and the portable phone body biases the flip in the opening direction but also the biasing mechanism is formed so as to bias the flip in the closing direction to always apply the closing biasing force in the closing direction when the flip is closed. Accordingly, the flip is prevented from being accidentally opened to ensure the well protected covered condition of the phone operating portion.

By the way, according to the present invention, the contact portion between the first cam portion of the rotary shaft and the second cam portion of the bearing portion for constituting the biasing mechanism is constituted by a member made of metal.

The biasing mechanism according to the invention is the structure for generating the biasing force by the pressing contact between the first cam portion and the second cam portion and the convex/concave engagement between the first cam portion and the second cam portion. In order to strengthen this biasing force (The larger the biasing force, the clearer the rotation of the flip in the closing direction and the opening direction will become.), the strong pressure may be applied to the contact portion between the rotary shaft and the bearing member.

However, in the case where the contact portion of the first cam portion and the second cam portion concave/convex engaged with each other by the strong pressure for generating the biasing force is made of resin, there is a problem in durability.

Accordingly, according to the invention, at least the contact portion between the first cam portion of the rotary shaft and the second cam portion of the bearing member is the metal contact to thereby considerably enhance the durability.

Also, with the second aspect of the invention, for example, in the case where all of the first cam portion and the second cam portion are made of metal, the structure is superior in durability but it is difficult to form the concave/convex arrangement of the first cam portion and the second cam portion, resulting in increased cost and less mass-productivity. In addition, the weight is increased. (There are strong demands to save weight as much as possible even with 0.1 g in this type product.) However, in this connection, in accordance with the second aspect of the invention, the first cam portion and the second cam portion are formed of synthetic resin and the contact portion between the first cam portion and the second cam portion is formed by arranging the metal member at the mutual concave/convex portions of the first cam portion and the second cam portion. Accordingly, only the minimum contact portion is made of metal whereby it goes without saying that the arrangement is superior in durability. Also, since it is easy to form the concave/convex structure, this is superior in cost saving factor and mass-production factor. In addition, it is possible to considerably reduce the weight in comparison with the case where all the first cam portion and the second cam portion are made of metal.

Also, in the case where the structure is provided in accordance with the third aspect of the invention, since the metal member is fitted and arranged in the mutual convex/concave portion between the first cam portion and the second cam portion, the assembling work is extremely facilitated to further reduce the cost, which is superior in mass-productivity.

DESCRIPTION OF THE PREFERRED EMBODIMENTS

Figure 1:
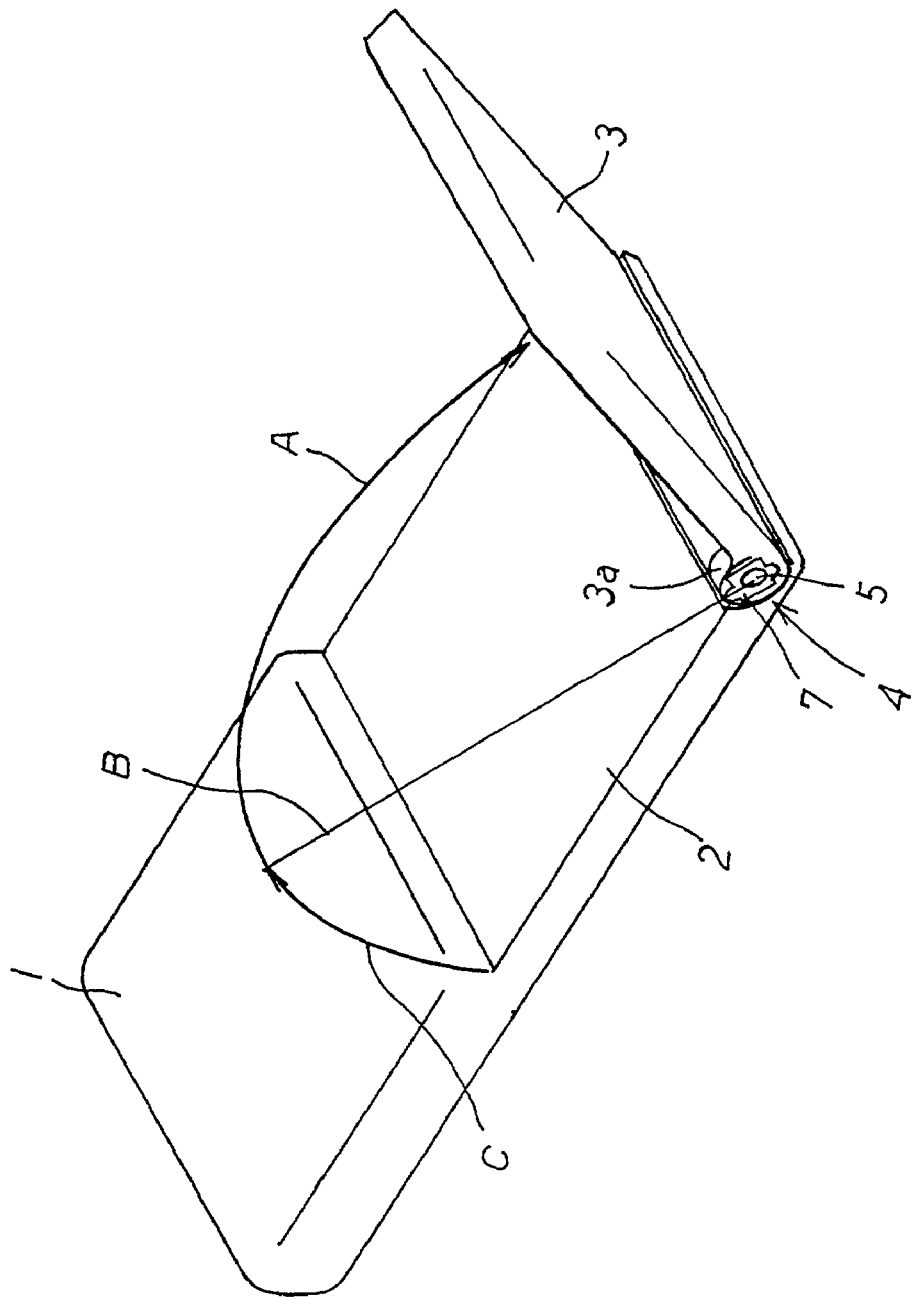
FIG. 1 is a perspective view of a portable phone in a used state according to an embodiment of the invention.

An embodiment of the present invention will now be described with reference to the accompanying drawings.

In this embodiment, a flip 3 that may rotated in an opening direction from a condition where a phone operating portion 2 arranged on a top surface of a portable phone body 1 is covered to a condition where the phone operating portion 2 is uncovered is provided in a predetermined position of the top surface of the portable phone body 1. A biasing mechanism is provided at a pivot portion 4 between this flip 3 and the portable phone body 1. The biasing mechanism is provided with a closing biasing force for biasing the flip 3 in the closing direction from a predetermined position B when the flip 3 is kept in a slanted condition relative to the surface of the portable phone body 1 in the closing direction in the closed side position in the case where the flip 3 covering the phone operating portion 2 is rotated through a predetermined angle, and an opening biasing force for biasing the flip 3 in the opening direction from the above-described predetermined position B to the position on the opened side.

The biasing mechanism in accordance with this embodiment will now be described.

The biasing mechanism according to this embodiment is composed of a rotary shaft 5 and a bearing member 6.

Figure 2:
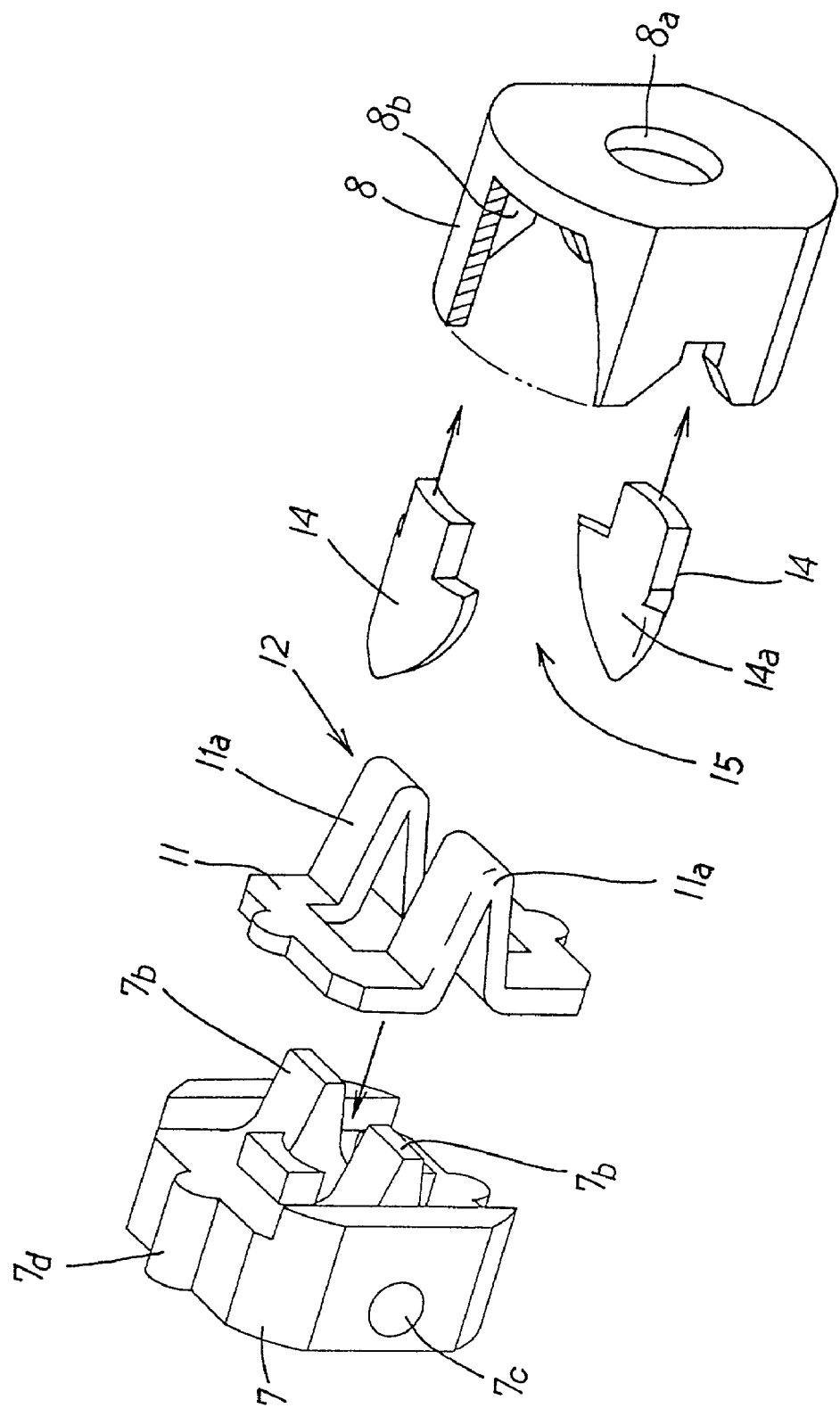
FIG. 2 is a developed perspective view of a primary part in accordance with the embodiment.
Figure 3:
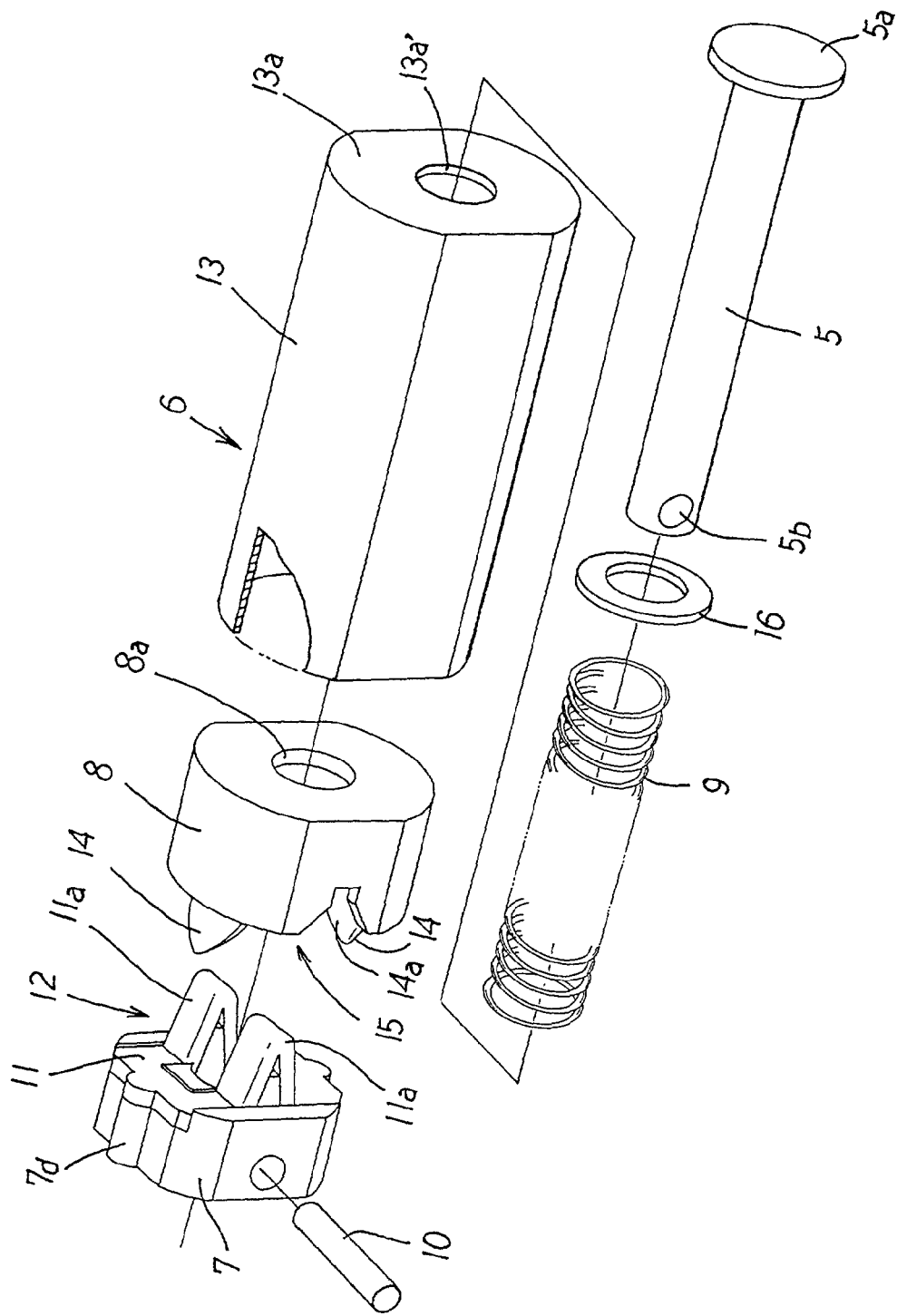
FIG. 3 is another developed perspective view of a primary part in accordance with the embodiment.
Figure 4:
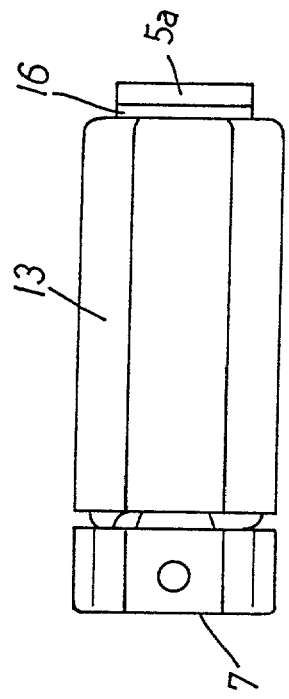
FIG. 4 is an illustration of a primary part in accordance with the embodiment.
Figure 4:
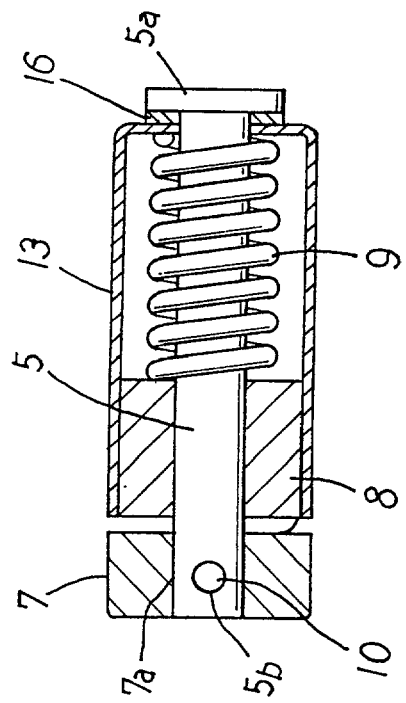
Figure 4:
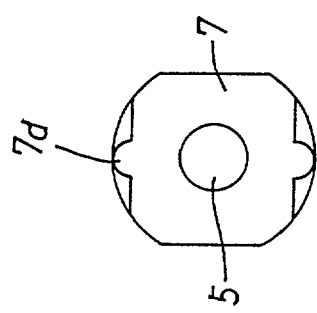

The rotary shaft 5 is obtained by forming a suitable metal made member into a cylindrical shape as shown in FIGS. 2 to 4.

A circumferential flanged portion 5a is formed at a proximal end portion of this rotary shaft 5. The circumferential flanged portion 5a is used to retain the rotary shaft 5 to a case body 13 of the bearing member 6 (to be described later) under the pull-apart preventing condition. Then, a hole 5b is formed in a distal end portion of the rotary shaft 5. This hole 5b is a retainer hole for retaining a first cam portion 7 through a pin rod 10.

The first cam portion 7 is provided at the distal end portion of the rotary shaft 5 as described above.

This first cam portion 7 is formed of suitable synthetic resin integrally.

Also, a hole 7a is formed in the central portion of the first cam portion 7. This hole 7a is a joint hole for fitting and coupling with the rotary shaft 5. A retainer hole 7c is a retainer hole for fitting the first cam portion 7 in the distal end portion of the rotary shaft 5 and inserting the pin rod 10 therethrough under this condition. An elongate projection 7d is used for fitting the first cam portion 7 to an installation portion 3a of the flip 3 under the rotation preventing condition.

Also, a pair of crest-shaped rising projections 7b are located at predetermined positions in an inner surface of the first cam portion 7 and formed at the peripheral edge of the hole 7a. A metal plate 11 is arranged on the surface of these rising projections 7b.

This metal plate 11 is formed by pressing a plate material made of suitable metal. V-shaped projections 11a are bent and formed in the right and left positions on the top surface of the metal plate 11. These V-shaped projections 11a are fitted over the rising projections 7b of the first cam portion 7 so that the metal plate 11 is fitted and disposed on the inner surface of the first cam portion 7.

Accordingly, a convex portion 12 is formed by right and left V-shaped projection portions 11a of the metal plate 11 in the first cam portion 7. The convex portion 12 is formed so as to engage with a recess portion 15 of the second cam portion 8 to be described later.

The bearing member 6 is composed of a case member 13 and the second cam portion 8 disposed within the case member 13.

The case member 13 is made by forming a member made of suitable metal into a cylindrical shape as shown in FIGS. 2 to 4. The case member 13 has the same cross-section shape as that of the second cam portion 8 to be described later and is formed so that the second cam portion 8 may be fitted and received slidably in the case member 13.

A hole 13a' having such a diameter that the rotary shaft 5 may be inserted rotatably into the hole is formed in the central portion of a wall portion 13a provided at one end portion of the case member 13. Accordingly, the tip end portion of the rotary shaft 5 is inserted from the outside of the case member 13 and a flanged portion 5a provided at the proximal end portion of the rotary shaft 5 is retained at a peripheral edge of the hole 13a' of the case member 13 so that the rotary shaft 5 may be coupled in the pull-apart preventing condition but rotatably.

As shown in FIGS. 2 to 4, the second cam portion 8 is made by forming a member made of suitable synthetic resin in a one-piece manner.

A hole 8a is formed in the central portion of the second cam portion 8. This hole 8a is a coupling hole for fitting and coupling with the rotary shaft 5.

Recess portion 8b which are formed at the edge portion of the hole 8a and diametrically opposite to each other with respect to the hole 8a are formed at two positions in predetermined positions of an inner surface of the second cam portion 8. Claw members 14 are disposed in the respective recess portions 8b.

The claw members 14 are made by forming a member made of suitable metal material in a press machining. Each of the claw members is formed to be sharp at its end and formed with a curved surface 14a in its inner surface.

Also, the claw members 14 are formed so that the proximal end portions thereof are fitted and disposed within the right and left recess portions 8b of the second cam portion 8, respectively.

Accordingly, a recess portion 15 is defined by the right and left claw members 14 at one end of the second cam portion 8. The recess portion 15 is formed so as to engage with the above-described convex portion 12 of the first cam portion 7.

The assembling work of the rotary shaft 5 and the bearing member 6 according to this embodiment will now be described.

First of all, the rotary shaft 5 is inserted into the case member 13 from the outside of the bearing member 6. Subsequently, the coil spring 9 is fitted at a position of the rotary shaft 5 within the case member 13. At the same time, the second cam portion 8 is fitted around the rotary shaft 5. Subsequently, the first cam portion 7 is fitted at the tip end portion of the rotary shaft 5 and is retained by a pin rod 10.

In this case, since the rotary shaft 5 and the bearing member 6 according to this embodiment are rotatable relative to each other and the first cam portion 7 is retained on the rotary shaft 5 so as to pressingly inserts the second cam portion 8 against the anti-spring compression of the coil spring 9, the convex portion 12 of the first cam portion 7 (V-shaped projections 11a) and the recess portion 15 of the second cam portion 8 (claw members 14) are in pressing contact and engagement with each other.

Accordingly, in this embodiment, the contact between the first cam portion 7 and the second cam portion 8 is the contact between the metal plate 11 and the claw members 14, i.e., the contact between the metal members.

Reference numeral 16 denotes a washer.

The effect of the biasing mechanism with the foregoing structure in accordance with this embodiment will now be described.

First of all, for instance, when the rotary shaft 5 is rotated relative to the bearing member 6, the first cam portion 7 rotates so as to push the second cam portion 8 (The second cam portion 8 is slidingly moved against the anti-spring compression of the coil spring 9.) In this case, until the rotary shaft 5 is rotated through about 90 degrees, the force for the concave/convex engagement is applied between the first cam portion 7 and the second cam portion 8 so that a return biasing force to rotate the rotary shaft 5 in the return direction occurs. Furthermore, from the position where the rotary shaft 5 has been rotated through about 90 degrees, a force from the non-concave/convex engagement to the concave/convex engagement works between the first cam portion 7 and the second cam portion 8 so that the advance biasing force to rotate the rotary shaft 5 in the advance direction occurs.

Figure 5:
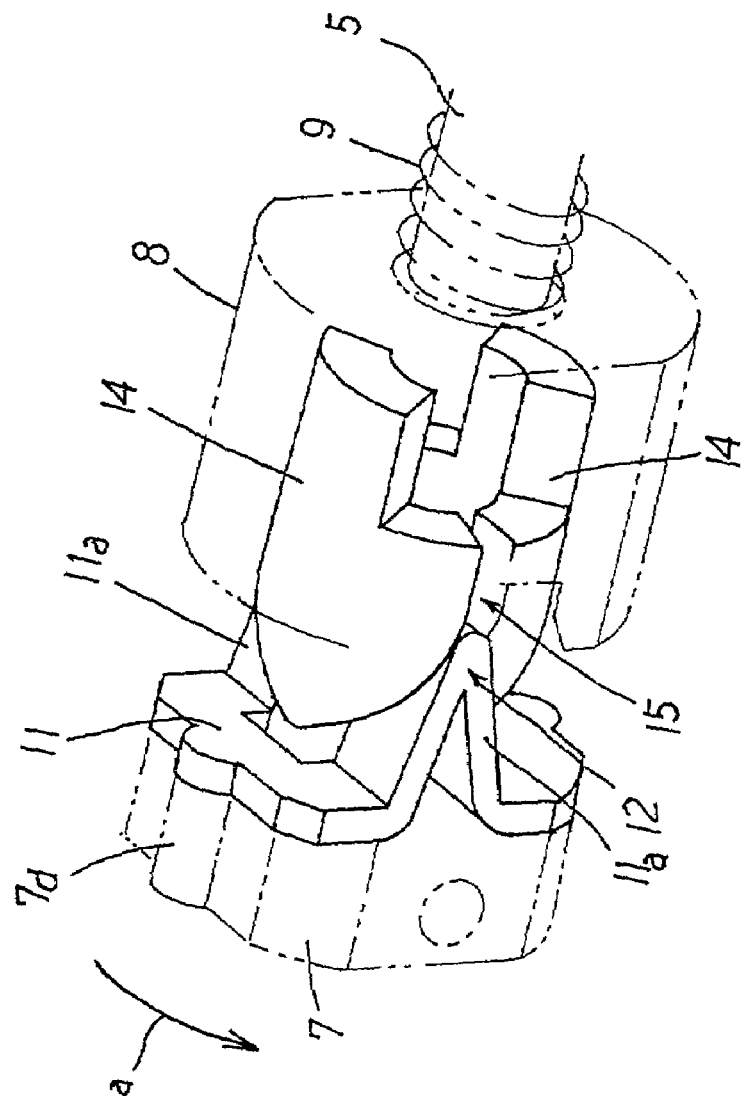
FIG. 5 is a schematic operational illustration of the primary part according to the embodiment.
Figure 6:
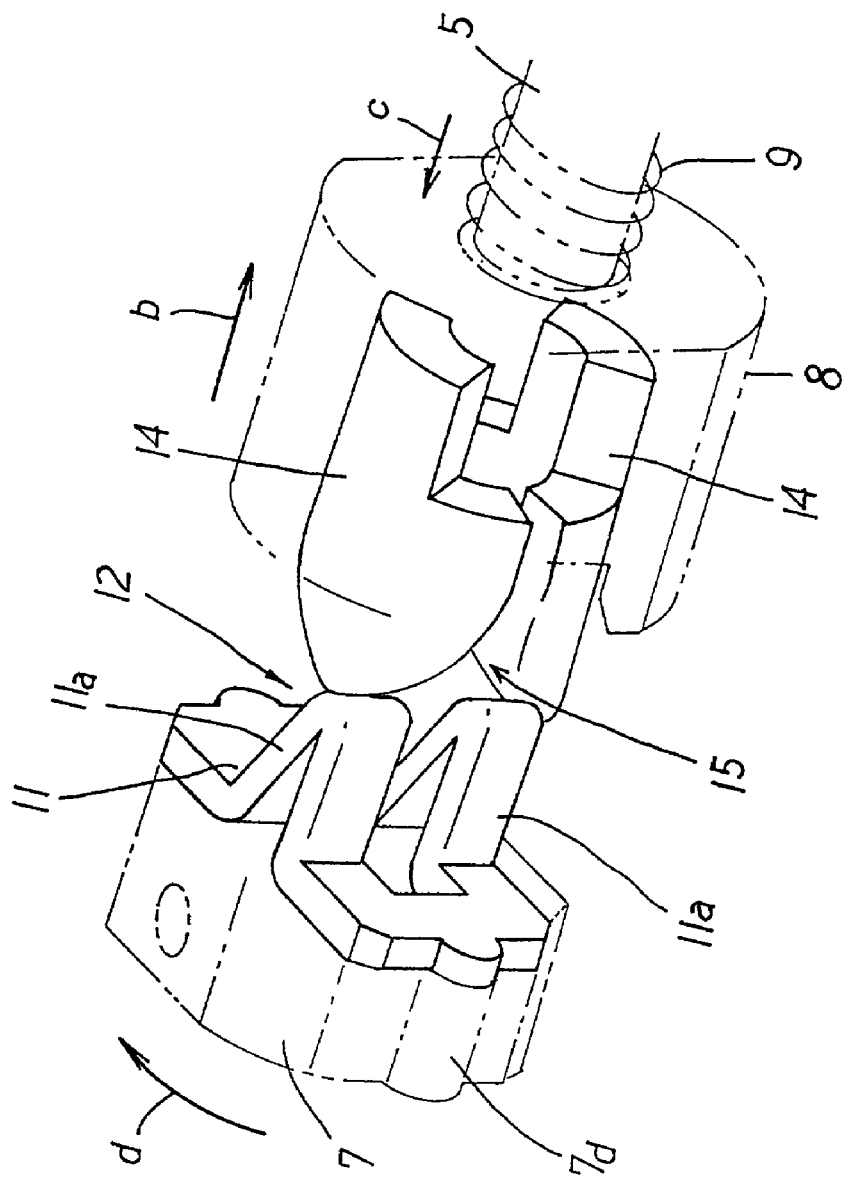
FIG. 6 is another schematic operational illustration of the primary part according to the embodiment.

Furthermore, more specifically, when the rotary shaft 5 is rotated in a direction indicated by an arrow a in FIG. 5, the first cam portion 7 and the second cam portion 8 which are concave/convex engaged with each other have been disengaged from each other so that the second cam portion 8 is moved against the anti-spring compression (in the direction indicated by an arrow c in FIG. 6) of the coil spring 9 in the direction indicated by an arrow b in FIG. 6. In this case, the anti-spring compression of the coil spring 9 is applied to the second cam portion 8 so that the curved surfaces 14a of the claw members 14 of the second cam portion 8 and the circumferential surfaces of the V-shaped projections 11a of the first cam portion 7 are slidingly moved. As a result, the force to engage the first cam portion 7 and the second cam portion 8 with each other occurs and the return biasing force to return the rotary shaft 5 in the direction indicated by the arrow d in FIG. 6 occurs.

Figure 7:
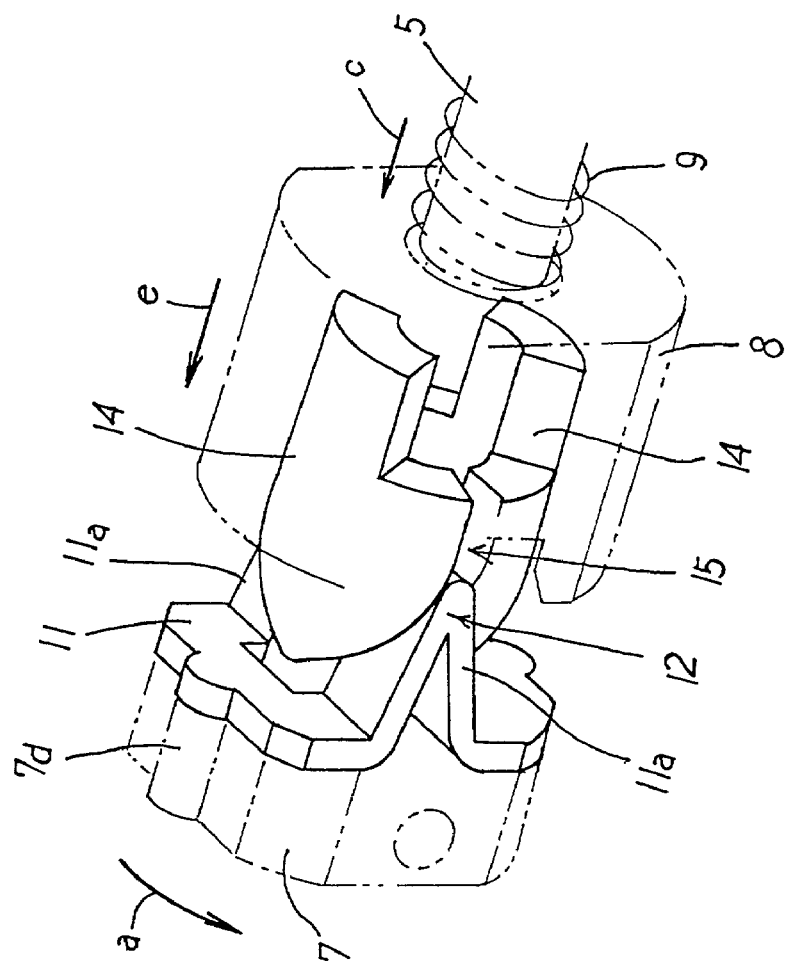
FIG. 7 is a schematic operational illustration of the primary part according to the embodiment.

Then, when the rotary shaft 5 is continuously rotated in the direction indicated by the arrow a in FIG. 7 (in the advance direction), the anti-spring compression (in the direction indicated by the arrow c in FIG. 7) of the coil spring 9 is applied to the second cam portion 8 so that the curved surfaces 14a of the claw members 14 of the second cam portion 8 and the circumferential surfaces of the V-shaped projections 11a of the first cam portion 7 are slidingly moved. As a result, a force to concave/convex engage the first cam portion 7 and the second cam portion 8 with each other occurs. (In this case, the second cam portion 8 is moved in the direction indicated by the arrow e in FIG. 7 by the anti-spring compression of the coil spring 9.) Thus, the advance biasing force to advance the rotary shaft 5 in the direction indicated by the arrow a in FIG. 7 occurs.

Namely, when the rotary shaft 5 is rotated through 180 degrees relative to the bearing member 6, the return biasing force always occurs until the rotary shaft is rotated through about 90 degrees, and the biasing force in the advance direction occurs in turn when the rotary shaft passes through the 90 degree position (so-called dead point). Namely, the biasing force in the reverse direction (the return biasing force and the advance biasing force) works the point of the 90 degrees as a border. Incidentally, in this embodiment, the border (dead point) between the return biasing force and the advance biasing force occurs whenever the rotary shaft is rotated through 90 degrees. This may be set up as desired by changing the shape or the like of the first cam portion 7 and the second cam portion 8.

Also, the biasing force has been described by exemplifying the case where the rotary shaft 5 is rotated relative to the bearing member 8 in this embodiment. Inversely, in the case where the bearing member 6 is rotated relative to the rotary shaft 5, it is possible to exhibit the return biasing force and the advance biasing force due to the relationship between the first cam portion 7 and the second cam portion 8. Namely, when the rotary shaft 5 and the bearing member 6 are rotated relative to each other, the relative rotational biasing force is generated between the first cam portion 7 and the second cam portion 8 due to the effect from the non-engagement condition to the engagement condition. It is possible to exhibit the biasing force by moving either one of the rotary shaft 5 and the bearing member 6.

The pivot structure between the flip 3 and the portable phone body 1 provided with the biasing mechanism in accordance with this embodiment will now be described.

As shown in FIG. 1, the first cam portion 7 of the rotary shaft 5 is fitted and prevented from rotating to the mounting portions 3a provided at the bottom surface and right and left positions on the proximal end of the flip 3. Under this condition, the bearing member 6 is fitted to the proximal end portion of the portable phone body 1 whereby the flip 3 is pivoted to the portable phone body 1.

In this case, in the embodiment, the return biasing force of the above-described biasing mechanism is caused to function as the closing biasing force for biasing the flip 3 in the closing direction, whereas the advance biasing force is caused to function as the opening biasing force for biasing the flip 3 in the opening direction.

Namely, as shown in FIG. 1, when the flip 3 is between a predetermined position B where the flip 3 is kept slanted to the surface 1 of the portable phone body 1 and the closed position C, the flip 3 is biased in the closing direction by the closing biasing force (return biasing force) of the biasing mechanism, whereas when the flip 3 is between the above-described predetermined position B and the open side position A, the flip 3 is biased in the opening direction by the opening biasing force (advance biasing force) of the biasing mechanism. Incidentally, in this embodiment, the predetermined position B where the flip 3 is kept slanted to the surface of the portable phone body 1 is set at the dead point of the biasing mechanism.

With such an arrangement, for instance, when the flip 3 is raised and rotated through a predetermined distance by a finger of the hand holding the portable phone body 1 and is caused to pass through the predetermined position B when the flip 3 is kept slanted relative to the surface of the portable phone body 1, the flip 3 is rotated in the opening direction by the opening biasing force of the biasing mechanism to expose the phone operating portion 2.

Also, when the flip 3 is rotated against the opening biasing force of the biasing mechanism and caused to pass through the above-described predetermined position B, the flip 3 is rotated in the closing direction by the closing biasing force of the biasing mechanism to become the condition that the phone operating portion 2 is covered.

Accordingly, in accordance with this embodiment, it is possible to quickly and easily switch the positions of the flip 3 with one hand holding the portable phone body 1 from the condition where the phone operating portion 2 is covered to the condition where the phone operating portion 2 is exposed. Furthermore, does not only the biasing mechanism provided in the hinge portion 4 between the flip 3 and the portable phone body 1 biases the flip 3 in the opening direction but also the biasing mechanism is formed so as to bias the flip 3 in the closing direction to always apply the closing biasing force in the closing direction when the flip 3 is closed. Accordingly, the flip 3 is prevented from being accidentally opened to ensure the well protected covered condition of the phone operating portion 2.

Also, in this embodiment, at least (possible minimum) the contact portion between the first cam portion 7 of the rotary shaft 5 and the second cam portion 8 of the bearing portion 6 is the metal contact, whereby it is possible to considerably enhance the durability thereof.

Also, in this embodiment, in the case where, for instance, all of the first cam portion 7 and the second cam portion 8 are made of metal, the structure is superior in durability but it is difficult to form the concave/convex arrangement of the first cam portion 7 and the second cam portion 8, resulting in increased cost and less mass-productivity. In addition, the weight is increased. (There are strong demands to save weight as much as possible even with 0.1 g in this type product.) However, in this connection, in accordance with this embodiment, the first cam portion 7 and the second cam portion 8 are formed of synthetic resin and the contact portion between the first cam portion 7 and the second cam portion 8 is formed by arranging the metal member at the mutual concave/convex portions of the first cam portion 7 and the second cam portion 8. Accordingly, only the minimum contact portion is made of metal whereby it goes without saying that the arrangement is superior in durability. Also, since it is easy to form the concave/convex structure, this is superior in cost saving factor and mass-production factor. In addition, it is possible to considerably reduce the weight in comparison with the case where all the first cam portion 7 and the second cam portion 8 are made of metal.

Also, in this embodiment, since the metal member is fitted at the mutual concave/convex portion of the first cam portion 7 and the second cam portion 8, the assembling work is extremely facilitated, which is less expensive and superior in mass-productivity.

With such a structure of the invention, it is possible to provide a novel opening/closing structure for a flip to be provided to a portable phone, in which at least the contact portion between the first cam portion of the rotary shaft and the second cam portion of the bearing member is the metal contact whereby the durability is considerably improved to thereby enhance the evaluation of the product on the market.

In accordance with a second aspect of the invention, only the minimum portion of the contact between the first cam portion and the second cam portion is formed of metal, whereby it goes without saying that the arrangement is superior in durability. Also, since it is easy to form the concave/convex structure, this is superior in cost saving factor and mass-production factor. In addition, it is possible to considerably reduce the weight in comparison with the case where all the first cam portion and the second cam portion are made of metal. Thus, it is possible to provide a novel opening/closing structure for a flip provided to a portable phone, which is high in evaluation on the market.

Also, in accordance with a third aspect of the invention, since the metal member is fitted at the mutual convex/concave portion of the first cam portion and the second cam portion, the assembling wok is extremely facilitated to be less expensive and superior in mass-productivity. Thus, it is possible to provide a novel opening/closing structure for a flip provided to a portable phone, which is high in evaluation on the market.

What is claimed is:

1. An opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, said biasing mechanism being provided in a hinge portion between the flip and the portable phone body, further comprising:
a rotary shaft;
a first cam portion provided on said rotary shaft;
a bearing member; and
a second cam portion provided in said bearing member and having a shape to come into pressing contact with said first cam and convex/concave engaged with said first cam portion;
wherein a relative rotation biasing force is generated between said rotary shaft and said bearing member by the engagement from the non-engagement between said first cam portion of said rotary shaft and said second cam portion of said bearing member when said rotary shaft and said bearing member are rotated relative to each other, and the relative rotation biasing force generated between said rotary shaft and said bearing member is caused to function as the closing biasing force and the opening biasing force to thereby constitute said biasing mechanism; and
at least a contact portion between said first cam portion of said rotary shaft and said second cam portion of said bearing member is formed by a member made of metal.

2. An opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, said biasing mechanism being provided in a hinge portion between the flip and the portable phone body, further comprising:
a rotary shaft;
a first cam portion provided on said rotary shaft;
a bearing member; and
a second cam portion provided in said bearing member and having a shape to come into pressing contact with said first cam and convex/concave engaged with said first cam portion;
wherein a relative rotation biasing force is generated between said rotary shaft and said bearing member by the engagement from the non-engagement between said first cam portion of said rotary shaft and said second cam portion of said bearing member when said rotary shaft and said bearing member are rotated relative to each other, and the relative rotation biasing force generated between said rotary shaft and said bearing member is caused to function as the closing biasing force and the opening biasing force to thereby constitute said biasing mechanism;
said first cam portion of said rotary shaft and said second cam portion of said bearing member are formed by a member made of synthetic resin; and
a contact portion between said first cam portion and said second cam portion is constituted by a metal member at a mutual convex/concave portion between said first cam portion and said second cam portion.

3. An opening/closing structure for a flip provided to a portable phone, comprising a flip that is rotatable in an opening direction from a condition where a phone operating portion provided on a surface of a portable phone body is covered by the flip to a condition where the phone operating portion is exposed is provided at a predetermined position on the surface of the portable phone body and a biasing mechanism provided with a closing biasing force to bias the flip in a closing direction in a closed side position from a predetermined position in the case where the flip kept under a condition where the phone operating portion is covered is rotated through a predetermined distance when the flip is kept slanted to the surface of the portable phone body and an opening biasing force to bias the flip in an opening direction in an opened side position from the predetermined position, said biasing mechanism being provided in a hinge portion between the flip and the portable phone body, further comprising:

a rotary shaft;

a first cam portion provided on said rotary shaft;

a bearing member; and a second cam portion provided in said bearing member and having a shape to come into pressing contact with said first cam and convex/concave engaged with said first cam portion;

wherein a relative rotation biasing force is generated between said rotary shaft and said bearing member by the engagement from the non-engagement between said first cam portion of said rotary shaft and said second cam portion of said bearing member when said rotary shaft and said bearing member are rotated relative to each other, and the relative rotation biasing force generated between said rotary shaft and said bearing member is caused to function as the closing biasing force and the opening biasing force to thereby constitute said biasing mechanism;

a metal member is fitted and arranged in a mutual convex/concave portion between said first cam portion of said rotary shaft and said second cam portion of said bearing member.

4. The opening/closing structure for a flip provided to a portable phone according to claim 1, wherein said metal member comprises:

a metal plate having V-shaped projections fitted over rising projections of said first cam portion; and a plurality of metal claw members, each claw member formed to have a sharp end and a curved surface, and wherein each claw member is fitted and disposed within a recess portion of said second cam portion, wherein said metal plate and said metal claw members contact each other during engagement of the first and second cam portions.

* * * * *